United States Patent [19]

Zondler et al.

[11] Patent Number: 4,702,559
[45] Date of Patent: Oct. 27, 1987

[54] LIQUID-CRYSTAL DISPLAY MADE FROM CONTINUOUS PLASTIC FILM SPLIT AND FOLDED THROUGH 90 DEGREES

[75] Inventors: Rolf Zondler; Jurgen Pottharst, both of Stuttgart, Fed. Rep. of Germany

[73] Assignee: Standard Electrik Lorenz, Stuttgart, Fed. Rep. of Germany

[21] Appl. No.: 906,116

[22] Filed: Sep. 11, 1986

[30] Foreign Application Priority Data

Sep. 12, 1985 [DE] Fed. Rep. of Germany ....... 3532485

[51] Int. Cl.⁴ .............................................. G02F 1/13
[52] U.S. Cl. ................... 350/331 R; 350/334; 350/339 R
[58] Field of Search ............... 350/331 R, 334, 339 R

[56] References Cited

U.S. PATENT DOCUMENTS

| | | | |
|---|---|---|---|
| 4,228,574 | 10/1980 | Culley et al. | 350/331 R X |
| 4,455,185 | 6/1984 | Sasaki et al. | 350/339 R X |
| 4,501,471 | 2/1985 | Culley et al. | 350/339 R X |
| 4,597,635 | 7/1986 | Hoshikawa | 350/336 X |
| 4,597,636 | 7/1986 | Hoshikawa | 350/331 R X |
| 4,636,037 | 1/1987 | Thomke et al. | 350/331 R X |

FOREIGN PATENT DOCUMENTS 54-126559 12/1979 Japan.
58-85416 8/1983 Japan.

Primary Examiner—John K. Corbin
Assistant Examiner—Richard F. Gallivan
Attorney, Agent, or Firm—Christie, Parker & Hale

[57] ABSTRACT

To simplify the liquid-crystal display film fabrication process, a single film strip is used which is divided into two films prior to the positioning of spacing means. After the spacing means have been positioned on the second film, the first film is folded through 90° and laid on the second film.

2 Claims, 2 Drawing Figures

Fig.2

U.S. Patent  Oct. 27, 1987  4,702,559
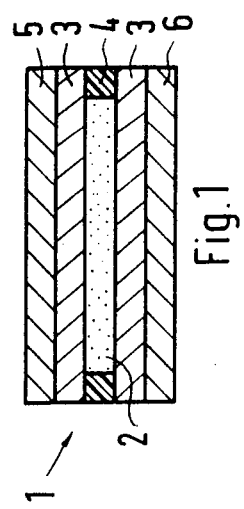
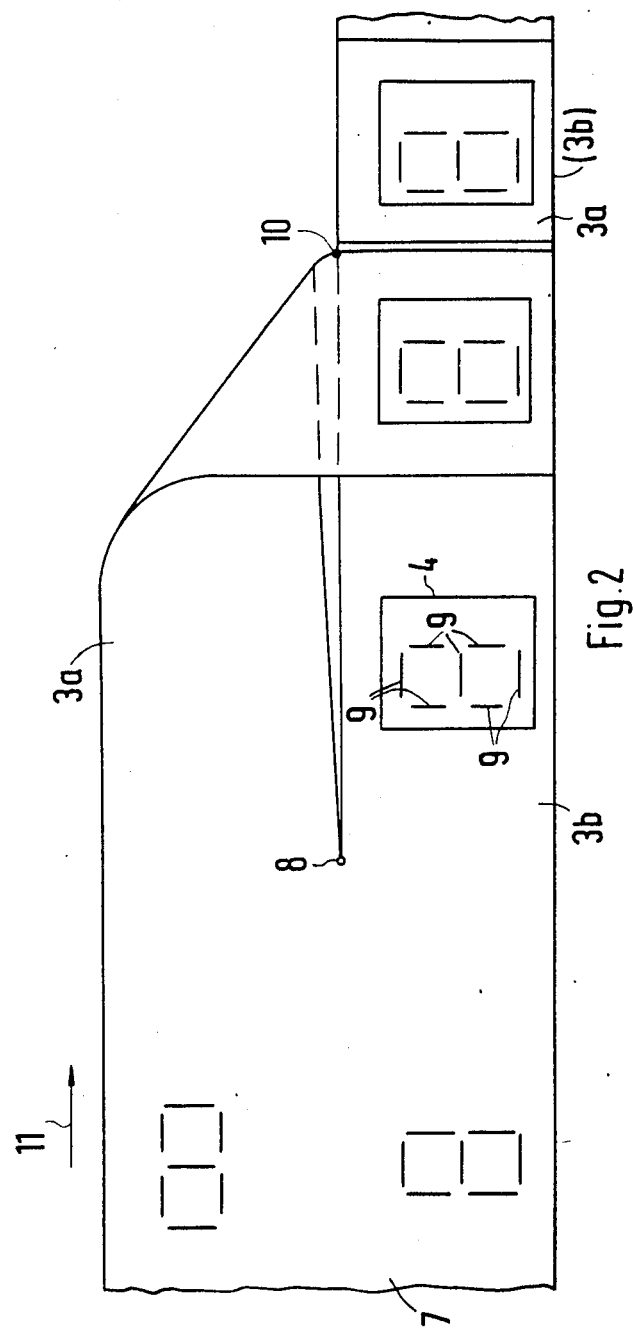

LIQUID-CRYSTAL DISPLAY MADE FROM CONTINUOUS PLASTIC FILM SPLIT AND FOLDED THROUGH 90 DEGREES

FIELD OF THE INVENTION

The present invention relates to a method of manufacturing a liquid-crystal display using a transparent film as a substrate material.

BACKGROUND ART

U.S. Pat. No. 4,228,574 discloses a liquid-crystal display in which the substrates enclosing the liquid-crystal material are transparent films of plastic. For continuous manufacture, two film strips are taken off two reels and then coated with transparent electrodes corresponding to the desired display pattern. Then, a parallel orientation is forced on the surfaces of the film strips in a single direction by rubbing. On one of the film strips, spacing means are then positioned around the electrodes, and liquid-crystal material is introduced immediately or after the second film strip has been placed on the spacing means. Finally, a polarizer may be attached to one of the film strips, and a reflector to the other.

SUMMARY OF THE DISCLOSURE

An overall object of the present invention is to provide a simpler method of manufacturing liquid-crystal displays.

To that end, a single film strip is used which is divided into two films prior to the positioning of spacing means. After the spacing means have been positioned on the second film, the first film is folded through 90° and laid on the second film.

BRIEF DESCRIPTION OF THE DRAWINGS

An embodiment of the invention will now be explained with reference to the accompanying Drawing, in which:

FIG. 1 is a cross-sectional view of a liquid-crystal display constructed in accordance with the present invention, and FIG. 2 shows schematically the step in which the films are laid one upon another.

DESCRIPTION OF A PREFERRED EMBODIMENT

In the liquid-crystal display 1 shown in FIG. 1, the liquid-crystal material 2 is sandwiched between two substrates formed by transparent films 3 of plastic. The films 3 are interconnected via a spacer 4. A polarizer 5 may be attached to the top surface of the liquid-crystal display 1, and a polarizing reflector 6 to its bottom surface. The polarizing reflector 6 may alternatively be a non-reflective polarizer if the liquid-crystal display 1 is used in the transmissive mode. The structure of the liquid-crystal display 1 and the materials and methods used to fabricate same are for the most part conventional and, therefore, will not be explained here in greater detail.

To fabricate liquid-crystal displays in accordance with the present invention, a single film strip 7 is taken off a single reel (not shown), and transparent electrodes determining the shape of the display are deposited on the film strip in the conventional manner. The surface of the film strip is then provided with a parallel orientation, also using conventional techniques. A film strip 7 so treated is shown in FIG. 2 at the left. It is moved in the direction of arrow 11. At the point 8, this film strip is divided into two films 3l and 3b. On the film 3b, the spacer 4 is positioned around the electrodes belonging together, 9. The film 3a is folded through 90°0 and laid on the film 3b in such a way that the electrodes belonging together are in alignment with each other. At the point 10, the film 3a is then cut along the edge of the film 3b, and the next portion of the film 3a is laid on the advancing film 3b in the manner described. After the spacer 4 has been positioned on the film 3b, and the liquid-crystal material 2 has been introduced, the films 3a and 3b and the spacer 4 are sealed where the film 3a is laid on the film 3b. If the introduction of the liquid-crystal material 2 takes place after the step of laying the film 3a on the film 3b, the film 3a will be closed except for a fill-in hole which is left after the film 3a has been laid on the film 3b, and the liquid-crystal material will be introduced in a subsequent step. The liquid-crystal displays can now be tested and then divided into the individual display units.

What is claimed is:

1. In a continuous process of manufacturing a plurality of individual liquid-crystal display units wherein a flexible, transparent material is continuously provided with electrodes for a plurality of individual liquid-crystal display units and a parallel orientation is continously imparted to its surface, spacing means for one particular individual display unit are positioned on one portion of said material, a second portion of said material for forming the opposing side of said one particular individual display unit is then placed on said first portion, and the two portions are then sealed together and the sealed structure is cut to form said one particular individual liquid-crystal display unit, the improvement comprising:
   (a) continually dividing a single film strip of said flexible, transparent material into a first film and a second film after said electrodes have been provided for said particular individual liquid-crystal display unit and said parallel orientation has been imparted thereto, and
   (b) continually folding said first film through 90° prior to placing said first film on said second film while said first film and said second film are still attached to said single film strip.

2. The improvement of claim 1, wherein said dividing step for a particular one of said display units is performed prior to the positioning of said spacing means for said particular unit.

* * * * *